US012775833B2

(12) United States Patent
Büttner et al.

(10) Patent No.: US 12,775,833 B2
(45) Date of Patent: Oct. 27, 2026

(54) AI-BASED OPERATION OF AN AUTOMATION SYSTEM

(71) Applicants: Florian Büttner, Munich (DE); Ralf Gross, Nuremberg (DE); Steffen Limmer, Munich (DE); Ingo Thon, Grasbrunn (DE)

(72) Inventors: Florian Büttner, Munich (DE); Ralf Gross, Nuremberg (DE); Steffen Limmer, Munich (DE); Ingo Thon, Grasbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 1741 days.

(21) Appl. No.: 17/100,811

(22) Filed: Nov. 20, 2020

(65) Prior Publication Data

US 2021/0158095 A1 May 27, 2021

(30) Foreign Application Priority Data

Nov. 22, 2019 (EP) .................................... 19210881

(51) Int. Cl.

*G06N 3/08* (2023.01)
*G05B 13/02* (2006.01)
*G06F 18/214* (2023.01)

(52) U.S. Cl.

CPC ............. *G06N 3/08* (2013.01); *G05B 13/027* (2013.01); *G06F 18/2148* (2023.01)

(58) Field of Classification Search

CPC ...... G06N 3/08; G06F 18/2148; G05B 13/027
See application file for complete search history.

(56) References Cited

U.S. PATENT DOCUMENTS

| | | | | |
|---|---|---|---|---|
| 6,031,185 | A | 2/2000 | Bouveret et al. | |
| 10,417,524 | B2 * | 9/2019 | Feng | G06F 18/2155 |
| 10,898,060 | B2 | 1/2021 | Yamada et al. | |
| 2002/0159642 | A1 * | 10/2002 | Whitney | G06F 18/41 382/225 |

(Continued)

FOREIGN PATENT DOCUMENTS

CN 106022392 A 10/2016

OTHER PUBLICATIONS

R. Shimizu, K. Asako, H. Ojima, S. Morinaga, M. Hamada and T. Kuroda, "Balanced Mini-Batch Training for Imbalanced Image Data Classification with Neural Network," 2018 First International Conference on Artificial Intelligence for Industries (AI4I), Laguna Hills, CA, USA, 2018, pp. 27-30 (Year: 2018).*

(Continued)

*Primary Examiner* — Shahid K Khan
(74) *Attorney, Agent, or Firm* — Lempia Summerfield Katz LLC

(57) ABSTRACT

A control device of an automation system, which is configured to control a plant, such as a production plant, including using an AI system, is provided. In an application of the control device, the device monitors the production with regard to the quality of the objects produced, for example, with regard to the presence of fault cases. The AI system is trained in advance based on a plurality of known states of the objects, so that the AI system may be trained for the occurrence of new, previously unknown states, where only a small number of example cases are required.

19 Claims, 4 Drawing Sheets

(56) References Cited

U.S. PATENT DOCUMENTS

| | | | | |
|---|---|---|---|---|
| 2016/0004963 | A1* | 1/2016 | Hasegawa | G06N 3/08<br>706/25 |
| 2017/0011185 | A1 | 1/2017 | Schweizer | |
| 2018/0232601 | A1* | 8/2018 | Feng | G06T 7/0004 |
| 2019/0180175 | A1* | 6/2019 | Meteer | G10L 15/26 |
| 2019/0347277 | A1* | 11/2019 | Tao | G06F 16/285 |
| 2020/0027545 | A1* | 1/2020 | Xie | G16B 40/00 |
| 2021/0073972 | A1* | 3/2021 | Wu | G06N 3/08 |

OTHER PUBLICATIONS

European Search Report for European Application No. 19210881.9-1205; dated May 4, 2020.

Mateusz Buda et al., A systematic study of the class imbalance problem in convolutional neural networks, arxiv.org, Cornell University Library, 201 Olin Library Cornell University Ithaca, NY 14853, KP081419603, DOI: 10.1016/J.NEUNET.2018.07.011; the whole document; 2017.

Shimizu Ryota et al., Balanced Mini-Batch Training for Imbalanced Image Data Classification with Neural Network, 2018 First International Conference on Artificial Intelligence for Industries (Al4I), IEEE, pp. 27-30, XP033529875, DOI: 10.1109/Al4I.2018.8665709; 2018.

German Office Action for German Application No. 10 2020 209 168.4 dated Apr. 22, 2021.

* cited by examiner

AI-BASED OPERATION OF AN AUTOMATION SYSTEM

This application claims the benefit of European Patent Application No. EP 19210881.9, filed Nov. 22, 2019, which is hereby incorporated by reference in its entirety.

BACKGROUND

The present embodiments relate to an automation system and a control device of the automation system for controlling a plant.

Control devices of modern automation systems (e.g., for the automatic production of products A, B, C) already employ artificial intelligence (AI) for controlling a process to be automated (e.g., AI systems are implemented in the respective control devices). These may be used, for example, to record the quality of the products produced as part of an automated production process (e.g., with regard to possible damage to the product or faulty assembly etc.). It has been shown that trained AI systems fulfill this function extremely reliably as long as the faults to be detected have been input into the upstream training stage of the AI system. Such a training process is known to be based on an extremely extensive data set, which consists, for example, of images of the products A, B, C to be produced in all kinds of states Z. The states Z include, for example, the intact states Z0 of the products A, B, C and faulty states Z1, Z2, Z3 of the products A, B, C. However, in the event that a fault FX that was not taken into account during the training in the production process occurs, the trained AI system is not able to identify this unknown fault state ZX reliably. Consequently, further training of the AI system is necessary to enable the AI system to detect the new fault FX reliably.

However, as is known, this training will require numerous different data records of the product containing the new fault FX. However, since modern production plants have very low defect rates and therefore only a few faults occur, it would take a correspondingly long time before the new data items required are available for further training of the AI system. It is becoming apparent that automated production facilities are being used increasingly frequently to produce specific products in comparatively small quantities, so that the data volumes required for conventional training of an AI system may not occur at all.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved control device of an automation system against the background described is provided.

A computer-implemented method describes the training of an artificial neural network KNN defined by parameters Phi of an AI system for a control device of an automation system. In a first act S1 of the training, the parameter Phi(0) is specified. In a second act S2, new parameters Phi(p) of the artificial neural network are determined with p=1, 2, . . . , in each case based on parameters Phi(p−1), thus in the first iteration based on Phi(0). The second act S2, which typically includes multiple repetitions, includes a selection procedure act S21(p) and a training procedure act S22(p), where p is increased by 1 for each repetition.

For each p, starting with p=1 and ending with p=Pmax, in the selection procedure act S21(p), classified data records are selected from a pre-provided database to create a minibatch, where the minibatch includes the selected data records. In the subsequent training procedure act S22(p), the artificial neural network KNN is trained using the selected classified data records and starting with parameters Phi(p−1), where in the training procedure act S22(p), new parameters Phi(p) defining the artificial neural network are determined. The previously provided database includes a plurality ND of classified data records for a plurality of objects i with i=A, B, C, such that for each of the objects i, a number Ni of classified data records is available, each assigned to the respective object i and/or representing the respective object. For example, a data record DSi(j) represents one of the objects i in a known state j. In the selection procedure act S21(p), to create the minibatch MB(p), a first group G1 of data records and a second group G2 of data records are then selected, each having at least one data record.

The requirement that the data records are "classified" provides that at least the object involved and the state occupied by the object are specified. Any information identifying the object, which may be relevant for the intended application of the KNN, may be considered as "states". For example, for a quality control application states such as "intact", "defective with fault F1", "defective with fault F2" etc., may be provided. However, a color or surface finish etc. of the object may also be used as a state.

The data records within a respective group G1(p) or G2(p) of the minibatch MB(p) may be similar with respect to the object i that the data records represent and with respect to the state Zj of the object i. This provides that for all data records of a respective group G1 or G2, the data records are assigned to the same object or represent the same object, and that the object or, if applicable, the similar objects represented by these data records are in the same state. In this case, the expression "the same object" or "the same state" etc. may, but does not have to, be "the exact same object" or "the exact same state". The requirement that data records are "similar" with respect to the objects represented thus provides that these similar data records represent at least the same type, possibly even the exact same object. For example, if a large number of identical objects or products that are produced in a manufacturing plant are produced and imaged by a camera as part of the quality control process, a corresponding number of data records or images that are similar with respect to the object are created. Even if one of these objects is imaged multiple times (e.g., at different manufacturing locations), so that the corresponding data records represent not only the same type of object but in fact the same object, then these data records are referred to as "similar" with respect to the object. This explanation should also be applied in the same way to the expression "similar with respect to the state".

The data records of different groups G1(p), G2(p) of the minibatch MB(p) are dissimilar with respect to the object i represented, and/or with respect to the state of the respective object i. In other words, the data records of the first group G1 represent a different object from the data records of the second group G2, and/or the state of the object represented by the first group G1 is different from the state of the object represented by the second group G2.

This procedure for training the AI system is based, for example, on the specific selection of the minibatches. A large number Pmax of these is created, where Pmax may be between 100 and 1000, for example. Accordingly, a large number of training procedure acts are carried out, ideally with different minibatches in each case. Since the pre-provided database is typically very extensive and therefore allows access to a very large volume of data, the training with the minibatches has the effect of a "meta-learning", with the result that due to the large number Pmax of repetitions or iterations of the second act or the training procedure act S22(p), the AI system in a sense learns to learn. The result of this is that in a further training procedure, it is sufficient if, as explained above, only a small number of cases may be provided as training material.

In one embodiment, the data records of the first group G1(p) and the data records of the second group G2(p) are similar with respect to the particular object i that the data records represent or are assigned to. This provides that the data records of the two groups represent the same kind of object. Consequently, the data records of the first group is to be different from the data records of the second group with respect to the state of this object (e.g., the data records of the first group represent the object in a first state, such as an intact object, and the data records of the second group represent the same type, or possibly the exact same object in a second state, such as a defective object with a specific fault or specific type of damage, or the like). This results in an efficient learning process of the AI system.

Alternatively, the data records of the first group and the data records of the second group may be dissimilar with respect to the particular object Oi that the data records are assigned to in each case. This provides that the data records of the two groups represent different objects (e.g., types of objects). Consequently, it does not matter whether or not the data records of the first group differ from the data records of the second group with regard to the states of the objects.

Each minibatch MB(p) contains, for example, a maximum of 50 records, a maximum of 20 records, or a maximum of 10 records. Although it would be conceivable for the minibatches to be made even larger due to the extensive database, a consequence of using smaller minibatches is that it is possible for the AI system to iterate through more learning processes with different scenarios in a given time. This also allows more efficient learning. Larger minibatches would reduce this number and hence the efficiency of the learning process.

A device for operating an automation system, which may be configured, for example, as a control device of the automation system, includes, in the delivery state or during commissioning of such an automation system, for example, an AI system with an artificial neural network KNN for generating control parameters for the automation system. The artificial neural network KNN is trained according to the method described above and is accordingly defined by parameters Phi(Pmax).

While the artificial neural network KNN trained in this way is powerful and may therefore be provided, for example, in the delivery state of the AI system or the control device or the automation system, in a sense the artificial neural network KNN is only pre-trained, because previously unknown faults FX or states ZX cannot be reliably identified, as explained above. A lengthy further training when the fault FX occurs in a plant that is already running is not desirable, as also explained above. However, if the new fault FX then occurs, due to the training procedure described, also known as "pre-training", it is possible to train the AI system further with only a few examples of the new fault FX by using the minibatches. After the second act S2 (e.g., with p=Pmax), in a further training act S3, based on the parameters Phi(Pmax) determined up to that point and based on a further minibatch MB*, further training is carried out in order to determine new parameters Phi(Pfin) that define the artificial neural network. The additional minibatch MB* is created such that the additional minibatch MB* contains new classified data records (e.g., data records that are not present in the pre-provided database). A data record is considered a "new" data record if, for example, the data record differs from the data records Dsi(j) (e.g., with i=A, B, C and j=Z0, Z1, Z2, Z3) originally contained in the database with respect to the object i represented or with respect to the state Z of the object i represented. A new data record therefore relates to an object or a state that was previously unknown (e.g., during the pre-training). For the problem described of the occurrence of a new fault FX or object state ZX, for example, the "new" data records differ from the original data records with respect to the state, but not with respect to the objects. The further training with the additional minibatch MB* thus created therefore results in an AI system that is further trained using fewer case examples and is able to reliably detect the new fault FX. The additional training act S3 is consequently carried out only if it is determined that one of the objects i is in a state ZX that was not known in the pre-provided database until that point and is not represented by any of the data records DSi(j) in the pre-provided database. The additional training act is preceded by a classification of the new data records with respect to the object represented and the state of this object.

The additional minibatch MB* is structured such that the additional minibatch MB* contains an additional first group G1* of classified data records (e.g., from the pre-provided database) and an additional second group G2* of classified data records including the new data records. The data records of the two additional groups G1*, G2* are similar with respect to the object that the data records are assigned to, and dissimilar with respect to the states of the object. This provides that the data records of the additional first group G1* represent the object in a first state, and the data records of the additional second group G2* represent the same object in a second, different state. Here again, each group G1*, G2* has at least one data record. This again enables an efficient training.

The additional second group G2* includes a maximum of 10 data records, a maximum of 5 data records, or a maximum of 3 data records. Thus, a rapid further training of the AI system with respect to the new fault FX is possible.

The new classified data records are finally transferred to the database to generate an updated version of the pre-provided database. This allows the control device and the AI system to be operated in a regulated manner such that the fault FX, which is no longer new, may be detected in the same way as the originally known faults F1, F2, F3.

The device mentioned above may be further developed compared to the delivery state mentioned in the example, such that the AI system is trained further and the artificial neural network KNN is thus now defined by parameters Phi(Pfin). This provides that the new fault FX may also be identified.

An automation system with the aforementioned advantages consequently has such a device, which is configured as a control device of the automation system.

During operation of such an automation system, the pre-trained AI system (e.g., working with parameters Phi (Pmax)) is trained further if it is determined that one of the objects is in a state ZX that was not known in the pre-provided database until that point and is not represented by any of the data records DSi(j) in the pre-provided database.

Further advantages and embodiments are obtained from the drawings and the corresponding description.

In the following, exemplary embodiments are explained in more detail by reference to drawings. There, same or functionally same components in different figures are identified by the same reference signs. It is therefore possible that in the description of a second figure no further detailed explanations may be given for a specific reference sign that has already been explained in connection with another, first figure. In such a case, it may be assumed that in the embodiment of the second figure, the component indicated there with this reference sign has the same characteristics and functions as explained in connection with the first figure, even without further explanation in connection with the second figure.

and

Figure 6:
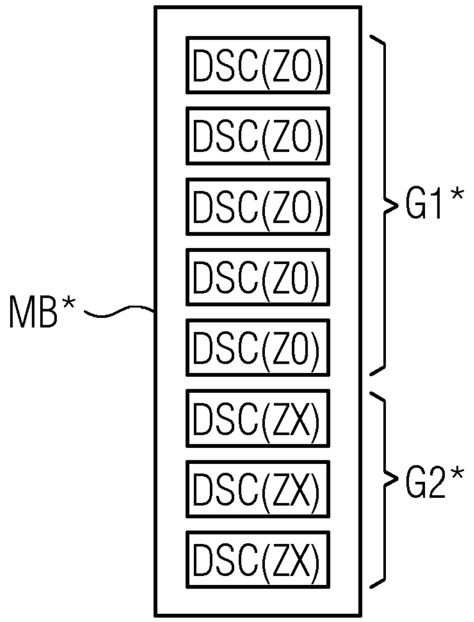

FIG. 6 shows another example of a minibatch.

DETAILED DESCRIPTION

Figure 1:
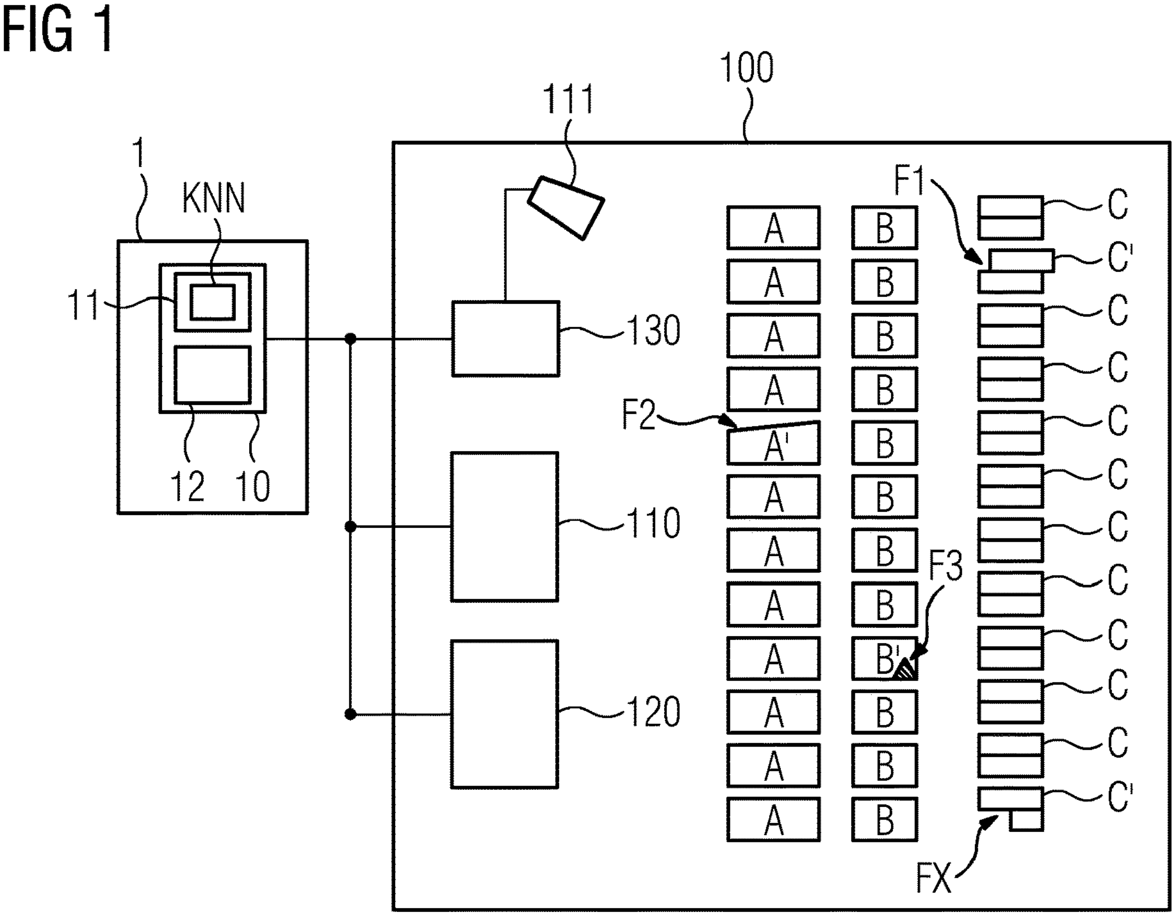
FIG. 1 shows one embodiment of a production plant with an automation system.

FIG. 1 shows one embodiment of an automation system 1 that controls a plant 100, implemented by the example of a production plant, or corresponding machines 110, 120, by a control device 10 of the automation system 1. The production plant 100 for the automatic production of at least part of a product A, B, C is chosen purely as one example of a plant that may be controlled by such an automation system 1. In general, the automation system 1 may be used for factory or process automation, for example, and the plant 100 appropriate to the field of application is controlled by the control device 10. In the following, it is assumed purely as an example that the plant 100 to be controlled is a production plant that is used to produce different objects or products A, B, C. A, B, and C represent product types or product groups and not individual products.

One of the production steps for producing the products A, B, C as part of a quality control process is an inspection of the products A, B, C, also controlled by the control device 10, with regard to the presence of production faults. With the aid of a quality control system 130 belonging to the production plant 100, it is checked whether the products A, B, C are defective (e.g., during the production process itself). The aim of this inspection is that a defective product A', B', C' may be detected in the quality control process and then removed from the production process, so that the delivery of a defective product A', B', C' to a customer, or more generally the use of such a defective product A', B', C', may be prevented at an early stage.

A product A, B, C that has a production fault F1, F2, etc. is consistently referred to here as a “defective product” and labeled with A', B', or C' in FIG. 1. Depending on which type of faults are to be detected in the quality control system, the quality control system 130 has a corresponding sensor system 131. In the following, it is assumed, again purely as an example, that the quality control system 130 is configured to detect damage or other faults (e.g., damage or other faults that may be detected externally). For example, in the case that the product A, B, C is assembled from a number of components during production, such faults may consist of the fact that these components have not been combined as intended, so that the presence of such a production fault F1 is even detectable visually. This is illustrated by the example of the product C'. Mechanical damage, for example, to the housing of a product A, B, C, is also detectable visually. These faults F2, F3 are also shown as examples for the products A', B'. The corresponding sensor system 131 of the quality control system 130 for detecting such faults is configured, for example, in the form of one or more cameras 131. The camera 131 is arranged such that the camera 131 may image the product A, B, C at a suitable point in the production process in a manner suitable for quality control.

The faults or fault types F1, F2, F3 introduced above and illustrated in FIG. 1 are to be understood purely as examples and do not indicate any restriction on the approach pursued here.

The sensor system 131 may be implemented in a different form as an alternative to a camera, and as already mentioned, according to the type of fault to be detected. For example, the sensor system 131 may be configured to detect or record acoustic or other effects (e.g., time series of production data). Conclusions as to the presence of the fault to be detected may be drawn from these effects. In each case, the sensor system 131 generates data records DSA, DSB, DSC for the products A, B, C. Such a data record DSi with i=A, B, C in the above-mentioned example case, where the sensor system 131 is implemented as a camera that generates images of the products A, B, C, is such an image generated by the camera 131.

In order then to detect defective products A', B', C' in quality control using the quality control system 130, every single image DSi recorded by the camera 131 is analyzed in a known manner using an AI system 11 of the control device 10 of the automation system 1, where “AI” stands for “artificial intelligence”. For this purpose, the data records DSi determined by the quality control system 130 are supplied to the AI system 11. The AI system 11 has access to a database 12 and includes a trained artificial neural network KNN, which is determined, also in a known way, by parameters Phi. This enables the AI system 11 to detect the already known faults F1, F2, F3 in new images or data records DSi. The control device 10 now generates control parameters for the production plant 100, which depend, among other things, on the analyses and/or output data of the AI system 11 (e.g., relating to the quality of the products A, B, C).

However, if the case of the problem described above occurs, in which one of the products (e.g., one of the products C) has a previously unknown fault type FX, the AI system 11 is not able to detect this new fault as such, since this fault was not known at the time this AI system 11 was trained. As also explained earlier, conventionally it is necessary to train the AI system 11, or a neural network KNN of the AI system 11, with great effort and based on a large number of cases. In FIG. 1, the nature of the fault FX is that one of the two components from which the product C is assembled is not moved as in the fault F1, but is occasionally missing.

Figure 5:
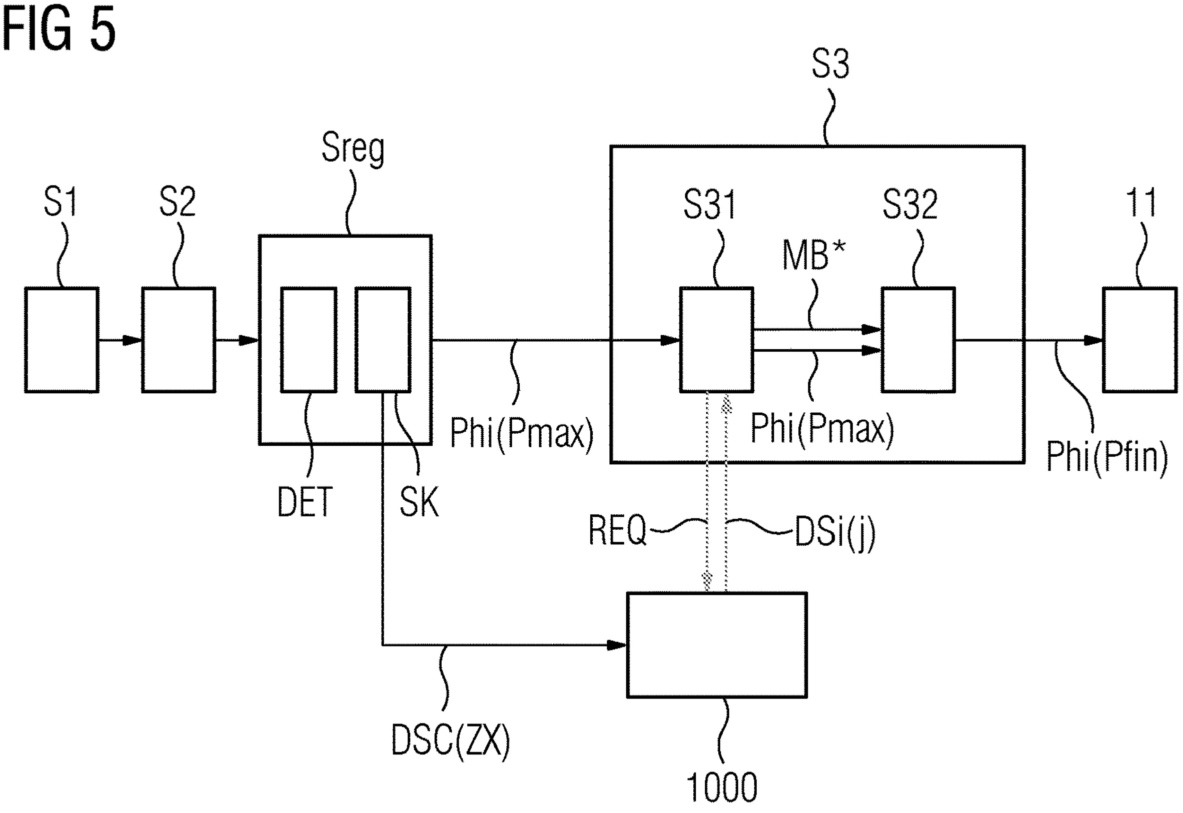
FIG. 5 shows one embodiment of a process for further training of the AI system.

The present embodiments provide the automation system 1 with the facility, with the aid of an appropriately configured AI system 11, to enable automated detection of such new faults quickly (e.g., based on exceptionally few cases). For this purpose, the AI system 11, or a corresponding ANN, is to be trainable based on these few cases alone, and/or based on the similarly few images or data records of the faulty products C'. The appropriate method to be used is explained in connection with FIG. 5. Before doing so, the method for the preliminary training or pre-training of the AI system 11 will be explained, which, for example, in the form of the specific selection of the "minibatches" to be introduced below, provides the basis for the AI system 11 to learn to subsequently detect the minibatches based on a small number of examples.

The fact that the AI system 11 is to be trainable based on only a few data records is satisfied by a suitable pre-training of the AI system 11 or the artificial neural network KNN being carried out, for example, at least within the preliminary training of the AI system 11 (e.g., as part of the training to which the AI system 11 is subjected before implemented in the automation system 1) or in the control device 10.

Figure 2:
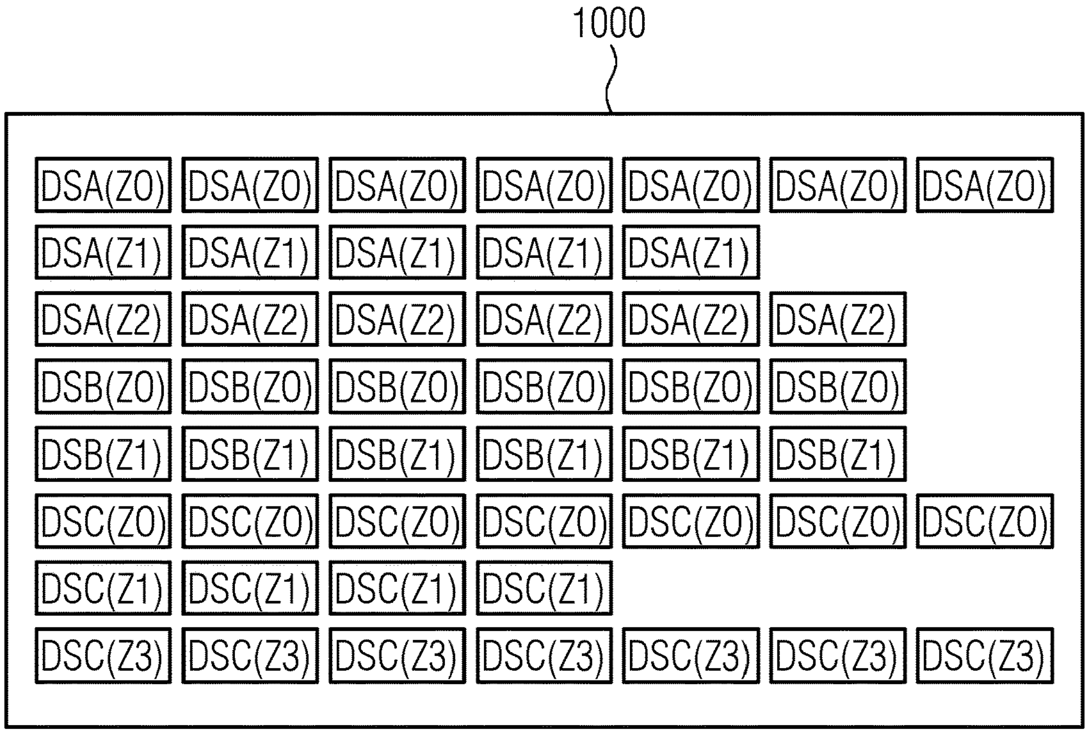
FIG. 2 shows one embodiment of a database.

For the pre-training, a database 1000 that already includes a large number of classified data records DSA, DSB, DSC relating to the products A, B, C, which have already been generated in advance, is used. The database 1000 is shown in FIG. 2 and in practice may be stored, for example, in the control device 10 (represented in FIG. 1 by the database 12). In this case, the term "classified", for the application envisaged here at least, provides that the data stored in a particular data record DSi is, firstly, which one of the products A, B, C a specific data record DSi relates to, or which of the products A, B or C this data record DS represents. Secondly, this data record DSi also stores the state Z in which the product A, B or C represented by the respective data record DS is located. In principle, any information identifying the product A, B or C that may be relevant for the intended application of the KI system 11 may be considered as "states". For example, for the quality control application assumed here, states such as Z0="ok" or Z0="intact" and generally Zf="faulty" may be distinguished. In the event that corresponding states exist and are relevant to the application, states such as Z0="ok", Z1="defective with fault F1", Z2="defective with fault F2", Z3="defective with fault F3", etc. may also be provided, where the faults F1, F2 are different and may correspond, for example, to the examples introduced above. However, a color or a surface finish etc. of the products A, B, C may also be used as the state Z.

The database 1000 provided includes a large number of classified data records DSA, DSB, DSC for each of the products A, B, C, assigned to the respective product A, B or C, and/or representing the respective product A, B or C, where the "assignment" may be realized by the classification alone, as this at least includes the product type and the respective state Z. For example, for each state Z of each product A, B, or C relevant to the application, the database 1000 includes a large number of classified data records DSA(Z(A)), DSB(Z(B)), DSC(Z(C)), where, for example, Z(A) provides the state of the product A in this data record DS(Z(A)), etc. For example, DSA(Z0) may be data records representing product A in state Z0 (e.g., "intact"). DSC(Z1) may be data records that represent product C in state Z1 (e.g., "defective with fault F1", etc.).

For the sake of clarity, only a few data records DSi(j) with j=Z0, Z1, Z2, Z3 . . . are shown in FIG. 2. In practice, the database 1000 or the area 1100 includes a much larger number of data records (e.g., at least large enough that the preliminary training of the AI system 11 is possible). The numbers of each of the available data records DSi(j) for products A, B, C may be different in different states Z0, Z1, Z2, Z3.

Figure 3:
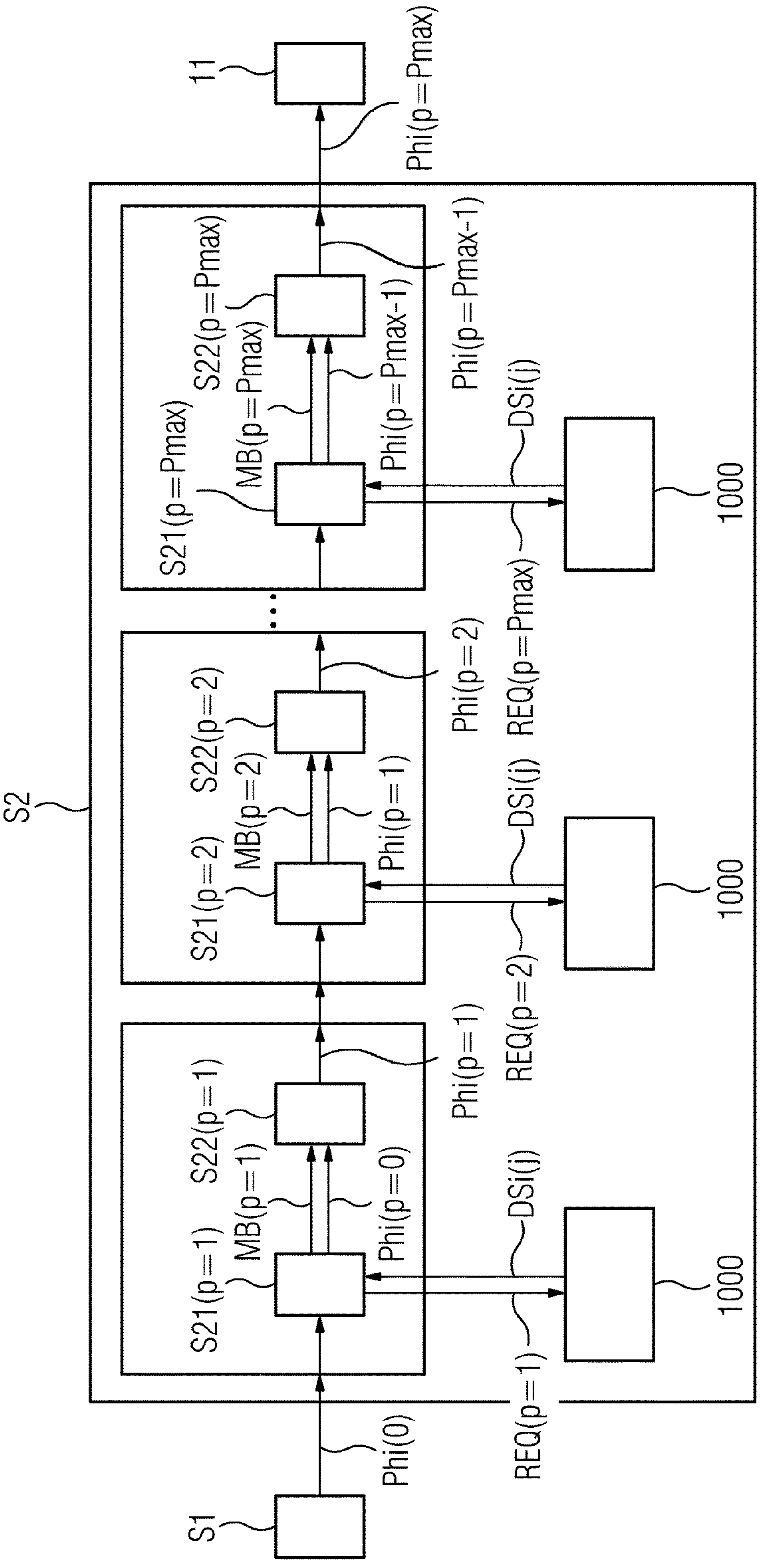
FIG. 3 shows one embodiment of a process for training an AI system.

In the pre-training of the AI system 11, the parameters Phi of the artificial neural network KNN are then optimized using the classified data sets DSi(j) available in the database 1000. This process is shown in FIG. 3.

In a first method act S1, initial parameters Phi(0) of the artificial neural network KNN are first made available.

In a second method act S2, which includes two acts S21, S22, the parameters Phi are optimized in typically a plurality of repetitions or iterations p with p=1, 2, . . . , Pmax, where p runs in ascending integer steps from 1 to Pmax.

In each of the repetitions p, starting with p=1, in the first act or in a selection procedure act S21(p), a minibatch MB(p) consisting of a plurality of classified data records DSi(j) is created from the database (e.g., classified data records DSi(j) are selected from the pre-provided database 1000), where the minibatch MB(p) then includes the selected data records DSi(j). In FIG. 3, the corresponding query or request to the database 1000, based on which the requested data records DSi(j) are provided, is symbolized by "REQ".

In the second act or in a training procedure act S22(p) of the repetition p, the respectively valid parameters Phi(p−1) of the artificial neural network KNN are optimized using the respective minibatch MB(p), typically in a plurality of iterations and using, for example, the known stochastic gradient descent (SGD) method, resulting in the parameters Phi(p) now optimized for this repetition act p. For example, the SGD method may be completed with 2 to 5 iterations. In other words, in the respective training procedure act S22(p), the artificial neural network KNN learns using the classified data records DSI(j) selected in the selection procedure act S21(p) and starting with parameters Phi(p−1), where in the training procedure act S22(p), new parameters Phi(p) that define the artificial neural network are generated.

The second method act S2 ends with the repetition p=Pmax, where, for example, the choice of Pmax may be made by considering whether the optimization method converges. For example, Pmax may be between 100 and 1000. On reaching p=Pmax, optimized parameters Phi(Pmax) exist for the artificial neural network KNN, which are ultimately transferred to the AI system 11 or are already present there because the described method acts S21 and S22 were executed there.

In the respective selection procedure act S21(p), as mentioned above, a minibatch MB(p) is generated from the classified data records DSi(j) from the database 1000. A given minibatch MB(p) is specifically generated and passed to act S22(p) such that the given minibatch MB(p) includes two groups G1(p), G2(p) of classified data records DSi(j), where, for selecting the data sets DSi(j) for groups G1(p), G2(p), two conditions are to be fulfilled: first, all data records DSG1(p) or DSG2(p) within a respective group G1(p) or G2(p) of the minibatch MB(p) are to be similar both with respect to the product A, B, or C to which the data records are assigned, and with respect to the state Z of this product A, B, or C. This provides that for all data records DSG1(p) or DSG2(p) of a respective group G1(p) or G2(p), the data records are to be assigned to the same product A, B, or C or represent the same product A, B, or C, and that the product A, B, or C represented by these data records DSG1(p) or DSG2(p) is in the same state Z. In this case, the expression "the same object", for example, may, but does not have to, be "the exact same object" throughout.

Second, the data records DSG1(p) and DSG2(p) of different groups G1(p) and G2(p) of the minibatch MB(p) may be dissimilar with respect to the product A, B, or C that the data records represent in each case, and/or with respect to the state Z of the represented product A, B, or C. In other words, the data records DSG1(p) of the first group G1(p) represent a different product than the data records DSG2(p) of the second group G2(p), and/or the state Z of the product represented by the first group G1(p) is different from the state Z of the product represented by the second group G2(p).

Figure 4:
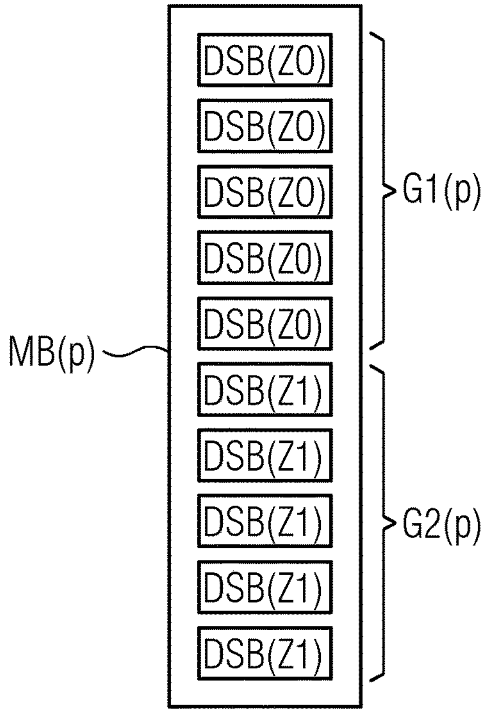
FIG. 4 shows an example of a minibatch.

Thus, in a purely exemplary manner as illustrated in FIG. 4, the data records DSG1(p) of the first group G1(p) may be selected such that the data records all represent product B in an intact state Z0 (e.g., DSG1(p)=DSB(Z0)). For example, the data records DSG2(p) of the second group G2(p) may also be selected such that the data records all represent product B. However, it is then also to be the case that the data records DSG2(p) represent the product B in a state other than the state Z0 (e.g., in state Z1 ("defective with fault F1")). It follows that DSG2(p)=DSB(Z1).

Alternatively, in the case of DSG1(p)=DSB(Z0), the data records DSG2(p) of the second group G2(p), for example, may also be selected such that the data records represent a different product than those of the group G1(p) (e.g., the product A). In this case, the data records may be selected such that the data records represent product A in almost any given state (e.g., Z=Z0). DSG2(p)=DSA(Z0) would then apply.

Therefore, if the data records DSG1(p) of the first group G1(p) are described by DSG1(p)=DSi(j) and if DSG2(p) =DSm(n) applies to the data records DSG2(p) of the second group G2(p), when generating the minibatch MB(p), it is to be the case that i≠m and/or j≠n, where i,m=A, B, C symbolizes the respective product A, B, C and j,n=Z0, Z1, Z2, Z3 symbolizes the respective state of the product A, B, C.

It is therefore to be provided that the data records DSG1 (p) of group G1(p) differ from the DSG2(p) of group G2(p), at least in terms of the product represented or in terms of the state. In one embodiment, all data records of the minibatch MB(p) (e.g., both the data records of the first group G1(p) and the data records of the second group G2(p)) are to represent the same product A, B, or C (e.g., DSG1(p)=DSi(j) and DSG2(p)=DSi(n) with j≠n). However, the data records DSG1(p) of the first group G1(p) represent this one product i in a first state j (e.g., product B in the intact state Z0), while the data records DSG2(p) of the second group G2(p) represent this one product B in another state n (e.g., product B in the defective state Z1 with fault 1).

With regard to the number of data records DSi(j) in the two groups G1(p), G2(p), for example, three to five data records DSi(j) may be sufficient in each case. The numbers of data records DSi(j) in groups G1(p), G2(p) may also be different.

In act S21(p), the specific selection of the data records DSG1(p), DSG2(p) of groups G1(p), G2(p) for the respective minibatch MB(p) essentially defines the database for the learning process of the artificial neural network KNN in training procedure act S22(p). The concrete selection of the classified data records DSG1(p), DSG2(p) of the two groups G1(p), G2(p) also provides the definition of the task or the "task generation" for the learning act of the AI system 11 (e.g., the allocation of the data records DSG1(p) of the first group G1(p) or the allocation of the data records DSG2(p) of the second group G2(p) according to respective classification). In other words, each selection procedure act S21(p) thus involves a respective generation of a minibatch MB(p) and implicitly also a generation of a task for the respective training procedure act S22(p), where this task definition may state, for example, that the AI system 11 should classify the data records DSG1(p), DSG2(p) of the respective minibatch MB(p) according to the respective product represented and according to a corresponding state.

After completion of the pre-training comprising the first and second method acts 51, S2, the AI system 11 has been trained to a point where the AI system 11 may identify the known states Z=Z0, Z1, Z2, Z3 of the known products A, B, C, so that, for example, the AI system 11 may be used for quality control. Accordingly, the AI system 11 trained in this way is implemented and used in the control device 10 and, if applicable, in a subordinate component thereof, by the data supplied by the sensor system 131 being evaluated by the AI system 11. If a fault case is detected by the AI system 11, the control device 10 may then (e.g., using a corresponding control signal for the automation system 1) cause the detected defective product to be removed from the production process or initiate other appropriate actions.

However, if a new type of fault FX or a corresponding state ZX occurs on a product, then due to the described pre-training with the specially selected minibatches MB, it is now possible to train the AI system 11 and the artificial neural network KNN of the AI system 11 with just a few example cases, so that the new type of fault FX on the affected product is reliably detected as a result. Here, for example, ZX may be "defective with fault FX". In the following, it is assumed, purely as an example, that one of the products C has the new, previously unknown fault FX. This is already illustrated in FIG. 1.

In order to be able to detect the new fault FX, the already fully functional, trained AI system 11 implemented in the control device 10, the artificial neural network KNN of which is still defined by the parameters Phi(Pmax), which, however, typically do not allow the new fault FX to be detected, is then further trained in an additional, third method act S3 such that the AI system 11 is ultimately defined by new parameters Phi(Pfin). The method to be applied is explained in connection with FIG. 5.

The third method act S3 with the acts S31 and S32 is triggered as soon as a new fault FX has been detected during normal operation Sreg of the plant 100 in act DET (e.g., on one of the products C). This may be signaled, for example, by the AI system 11 failing to detect which state the product i is in from an image DSi that has just been recorded. As a result, the affected data records DSC(ZX) are classified according to the fault FX in act SK. This may be carried out manually, for example, in a known manner. The new data records DSC(ZX) classified in this way are transferred to the database 1000.

For the additional, third method act or training act S3 in act S31, a further minibatch MB* based on the data records DSC(ZX) of the product C in the state ZX (e.g., the faulty product C') newly recorded by the sensor system 131 is used as training data, together with data records DSC(Z0) of the product C in the intact state Z0 that already exist in the database 1000.

In order to further train the AI system 11 and the artificial neural network KNN with the new data records DSC(ZX), or cause the AI system 11 to learn from the new data, in training act S3, the additional minibatch MB* mentioned is assembled from another first group G1* of classified data records DSG1* (e.g., from the pre-provided database 1000) and another second group G2* of classified data records DSG2*. An example of this is illustrated in FIG. 6.

In general, the additional second group G2* should include the new data records DSC(ZX) (e.g., DSG2*=DSC (ZX)). Further, the data records DSG1*, DSG2* of the two additional groups G1*, G2* may first be similar with respect to the product to which the data records are assigned.

Second, the data records DSG1*, DSG2* of the two additional groups G1*, G2* may be dissimilar with respect to the states of this product. This provides that the data records DSG1* of the additional first group G1* represent the affected product (e.g., product C as before) in a first originally known state Zj, and the data records DSG2* of the further second group G2* represent the same affected product C in a second, new state ZX with Zj≠ZX. Subject to the requirement that DSG2*.DSC(ZX) (e.g., the constraint), DSG1*=DSC(Zj) with Zj=Z0, Z1, Z2, Z3 may therefore apply to the additional first group G1*.

Specifically, the additional first group G1* may include a number NDSalt of classified data records DSG1* for product C in the already known state Zj. These data records DSC(Z0) or DSC(Z1), which are given here as examples, were already present in the original, pre-provided database 1000. NDSalt is ultimately limited only by the number of old data records for the affected product in the desired state Zj originally present in the database 1000. For example, NDSalt=5 may apply.

The additional second group G2* is created to include a number NDSneu of new classified data records DSG2* for the defective product C' in the new state ZX, and typically all available new data records DSC(ZX) for the defective product C' in the state ZX.

Since only few such new data records DSC(ZX) are available, as this additional training is to be carried out soon after the new fault FX has occurred, in order to provide that the production plant 100 controlled by the automation system 1 may react as early as possible to the occurrence of this new fault FX (e.g., by removing the defective product C' from the production process), NDSneu is typically ≤10, NDSneu≤5, or NDSneu≤3.

The additional minibatch MB*, therefore including a number NDSalt+NDSneu of data records DSC(Z0) of the product C in the intact state as well as data records DSC(ZX) of the product C in the defective state ZX with fault FX, is now used in the further training act S3 to further optimize the parameters Phi of the artificial neural network KNN (e.g., using the known SGD procedure again).

For this purpose, in training act S32, the parameters Phi of the artificial neural network KNN are optimized based on the currently valid parameters Phi(Pmax) and using the additional minibatch MB* in one or possibly more iterations, for example, again using the previously mentioned SGD procedure, resulting in newly optimized parameters Phi(Pfin). In other words, the artificial neural network KNN learns using the classified data records DSC(Z0), DSC(ZX) of the additional minibatch MB* and starting with parameters Phi(Pmax), where in training act S3, new parameters Phi(Pfin) that define the artificial neural network are generated.

In contrast to the second method act S2 of the pre-training, the training act S3 may not need to be repeated, or runs only once.

This concept is based on the fact that in an AI system 11 that is pre-trained as described above based on the minibatch MB(p), this system may be trained so efficiently using only, for example, NDSneu=3 or even fewer cases that a powerful AI system 11 that then also detects the faults FX or state ZX that were not known during the pre-training may be provided. This is due to the fact that the choice of minibatches MB(p) described and the corresponding training of the AI system 11 have a "meta-learning" effect, so that due to the plurality Pmax of repetitions or iterations of the second act or training procedure act S22(p), the AI system 11 has learned to learn, with the result that in the further training, it is sufficient to provide only a few cases NDSneu as training material. This basic approach is used, for example, in the Reptile algorithm for meta-learning.

Since the further optimization or further training in act S3 may be carried out with comparatively little effort and without particularly high demands on the available computing power etc., it is not necessary to perform this optimization on, for example, a central, powerful computer, but it is feasible to perform the optimization directly on the given control device 100 of the automation system 1. Even if the AI system 11 is implemented on an "edge device", which is often characterized by a somewhat reduced computing power, the optimization may be carried out locally due to the low requirements.

In practice, for example, an AI system 11 may initially be trained or pre-trained with acts S1, S2 and using the minibatches MB(p) consisting of data records DSi(j) from the pre-provided database 1000, such that the artificial neural network KNN of the AI system 11 is defined by optimized parameters Phi(Pmax). This AI system 11 with the artificial neural network KNN thus optimized may then be implemented (e.g., in the control unit 100 or, as indicated above, on an "edge device", etc.) before this is put into operation. In one embodiment, the pre-trained AI system 11 may be retrofitted on such a device and put into operation. In each of the above cases, as described, it is then possible to optimize the AI system 11 later using fewer new case examples.

For creating the various minibatches MB, MB*, criteria for selecting the data records of the respective first G1, G1* and second groups G2, G2* were given. It may be the case that for a respective minibatch MB, MB* the data records of both the respective first G1, G1* and the respective second group G2, G2* are selected such that the data records represent the same product (e.g., DSi(j) and DSi(n) with j≠n). Consequently, the data sets would then be selected such that the states of the products of the first group differ from those of the second group. Thus, data sets DSi(j) and DSi(n) with i=A, B, or C and j≠1 are ultimately selected for the first and second groups, respectively.

The present embodiments have been explained in an exemplary way based on a quality control system 130 of a production plant 100. In general, however, the present embodiments may be used in any system (e.g., in automation systems 1) in which analyses or the like are carried out based on artificial intelligence or artificial neural networks, and in which when new (e.g., previously unknown) situations occur, the artificial neural network is to adapt to the new situation. In other words, only very few data sets are available with which the artificial neural network can be trained. For example, the approach described may be used in biomedicine for the classification of rare cell types or in the field of personalized medicine for AI-based assignment of individual patients to patient groups.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for a control device of an automation system, for training an artificial neural network defined by parameters, of an AI system of the control device, the method comprising:

determining new parameters of the artificial neural network such that for each p starting at p=1 and ending at p=Pmax:

in a selection procedure step for creating a minibatch, selecting classified data records from a previously provided database; and in a training procedure step, training the artificial neural network using the minibatches and based on parameters such that new parameters defining the artificial neural network are determined in each case, wherein for a plurality of objects, the pre-provided database comprises a plurality of classified data records for each object of the plurality of objects, representing the respective object in the state, wherein in the selection procedure step, to create the minibatch, a first group of data records and a second group of data records are selected, each having at least one data record, wherein the data records of a respective group of the minibatch are the same with respect to the object that the data records represent and with respect to the state of the object, and wherein the data records of different groups of the minibatch are not the same with respect to the object that the data records represent, with respect to the state of the object, or with respect to a combination thereof.

2. The method of claim 1, wherein the data records of the first group and the data records of the second group are the same with respect to the object that the data records represent in each case.

3. The method of claim 1, wherein the respective minibatch comprises a maximum of 50 data records.

4. The method of claim 3, wherein the respective minibatch comprises a maximum of 20 data records.

5. The method of claim 4, wherein the respective minibatch comprises a maximum of 10 data records.

6. The method of claim 1, wherein the determining of the new parameters further comprises, when required, further training the artificial neural network in a further training step based on the parameters determined up to that point and based on an additional minibatch, such that new parameters that define the artificial neural network are determined, wherein the additional minibatch contains new classified data sets, and wherein a given new data record differs from the data records of the pre-provided database with respect to the object that the new data record represents, or with respect to the state of the object that the new data record represents.

7. The method of claim 6, wherein the further training step is executed when it is determined that one of the objects is in a state that is not known in the pre-provided database and is not represented by any of the data records in the pre-provided database.

8. The method of claim 6, wherein the further training step is preceded by a classification of the new data records.

9. The method of claim 6, wherein the additional minibatch comprises an additional first group of classified data records and an additional second group of classified data records, wherein the additional second group of classified data records comprises the new data records, and wherein the data records of the additional first group of classified data records and the additional second group of classified data records are the same with respect to the object and not the same with respect to the states of the object.

10. The method of claim 9, wherein the additional first group of classified data records is from the pre-provided database.

11. The method of claim 9, wherein the additional second group of classified data records comprises a maximum of ten data records.

12. The method of claim 11, wherein the additional second group of classified data records comprises a maximum of five data records.

13. The method of claim 12, wherein the additional second group of classified data records comprises a maximum of three data records.

14. The method of claim 6, wherein the new classified data records are transferred into the pre-provided database.

15. The method of claim 1, wherein when it is determined that one of the objects is in a state, which is not known in the pre-provided database and is not represented by any of the data records in the pre-provided database, the determining of the new parameters further comprises, when required, further training the artificial neural network in a further training step based on the parameters determined up to that point and based on an additional minibatch, such that new parameters that define the artificial neural network are determined, wherein the additional minibatch contains new classified data sets, and wherein a given new data record differs from the data records of the pre-provided database with respect to the object that the new data record represents, or with respect to the state of the object that the new data record represents.

16. A device for operating an automation system, the device comprising:

an artificial intelligence (AI) system comprising:

a processor; and an artificial neural network for generating a control signal for the automation system, wherein the processor is configured to train the artificial neural network defined by parameters, of the AI system of the device, the training of the artificial neural network comprising:

determination of new parameters of the artificial neural network such that for each p starting at p=1 and ending at p=Pmax:

in a selection procedure step for creation of a minibatch, selection of classified data records from a previously provided database; and in a training procedure step, training the artificial neural network using the minibatches and based on parameters such that new parameters defining the artificial neural network are determined in each case, wherein for a plurality of objects, the pre-provided database comprises a plurality of classified data records for each object of the plurality of objects, representing the respective object in the state, wherein in the selection procedure step, to create the minibatch, a first group of data records and a second group of data records are selected, each having at least one data record, wherein the data records of a respective group of the minibatch are the same with respect to the object that the data records represent and with respect to the state of the object, and wherein the data records of different groups of the minibatch are not the same with respect to the object that the data records represent, with respect to the state of the object, or with respect to a combination thereof.

17. The device of claim 16, wherein the device is a control device.

18. The device of claim 16, wherein the determination of the new parameters further comprises, when required, further training of the artificial neural network in a further training step based on the parameters determined up to that point and based on an additional minibatch, such that new parameters that define the artificial neural network are determined, wherein the additional minibatch contains new classified data sets, and wherein a given new data record differs from the data records of the pre-provided database with respect to the object that the new data record represents, or with respect to the state of the object that the new data record represents.

19. An automation system comprising:

a device configured as a control device of the automation system, the control device comprising:

an artificial intelligence (AI) system comprising:

a processor; and an artificial neural network for generating a control signal for the automation system, wherein the processor is configured to train the artificial neural network defined by parameters, of the AI system of the control device, the training of the artificial neural network comprising:

determination of new parameters of the artificial neural network such that for each p starting at p=1 and ending at p=Pmax:

in a selection procedure step for creation of a minibatch, selection of classified data records from a previously provided database; and in a training procedure step, training the artificial neural network using the minibatches and based on parameters such that new parameters defining the artificial neural network are determined in each case, wherein for a plurality of objects, the pre-provided database comprises a plurality of classified data records for each object of the plurality of objects, representing the respective object in the state, wherein in the selection procedure step, to create the minibatch, a first group of data records and a second group of data records are selected, each having at least one data record, wherein the data records of a respective group of the minibatch are the same with respect to the object that the data records represent and with respect to the state of the object, and wherein the data records of different groups of the minibatch are not the same with respect to the object that the data records represent, with respect to the state of the object, or with respect to a combination thereof.

* * * * *